Feb. 13, 1968   H. KARTLUKE ET AL   3,368,610
SUPERHEATING PREVENTION AND BOILING CONTROL
Filed July 8, 1965   2 Sheets-Sheet 1

INVENTORS.
HERBERT KARTLUKE
BY CHARLES A. BOYD

*Seidel & Gonda*

ATTORNEYS.

United States Patent Office 3,368,610
Patented Feb. 13, 1968

3,368,610
SUPERHEATING PREVENTION AND
BOILING CONTROL
Herbert Kartluke and Charles A. Boyd, West Chester,
Pa., assignors, by mesne assignments, to the United
States of America as represented by the United States
Atomic Energy Commission
Filed July 8, 1965, Ser. No. 470,540
8 Claims. (Cl. 165—1)

ABSTRACT OF THE DISCLOSURE

The disclosure describes the discovery of the prevention of superheating in a boiling fluid by the use of vibrational energy to produce cavitation within a heated fluid thereby providing nucleation center for the formation of vapor-containing bubbles.

---

This invention relates to superheating prevention and boiling control. More particularly, this invention is directed to apparatus and method for preventing liquid or molten materials from superheating and thereby promoting uniform boiling.

The prevention of superheating is of considerable importance with many materials and in a variety of applications. The basic theory of fractional distillation, for example, assumes continuous uniform boiling which must be obtained and maintained. In a liquid metal nuclear reactor, such as one using molten potassium, avoidance of superheating is of major concern since it causes, inter alia, tremendous density changes which drastically alter the moderator characteristics and thereby give resultant fluctuations in the reactor power output.

Heretofore, a variety of expedients have been utilized to promote uniform boiling. Thus, it has been suggested that chips, such as pieces of porous clay, be added to heated liquids to promote uniform boiling. Other methods suggested heretofore include bubbling gases through the heated liquid, and use of alternating current or spark gaps. In many environments, none of these can be utilized and each has its own perculiar disadvantage. For example, the chips must be continuously added to the liquid and of course cannot be utilized when the liquid or molten metal is in a closed system.

The introduction of gases into the heated liquid or molten material is not always acceptable or permissible in view of the fact that undesirable contamination or chemical reactions may occur. Moreover, the introduction of gas bubbles into the liquid or molten material serves primarily to agitate the liquid to prevent local overheating, and only large bubbles are formed which do not make good nuclei. The present invention produces small or microscopic bubbles having particular utility for forming nuclei to prevent superheating. As will be apparent to those skilled in the art, superheating in many environments is undesirable due to the fact that it results in a sudden release of energy which may cause the liquid or molten material to blow up or contaminate other portions of a system.

The prevention of superheating and the promotion of uniform boiling is of particular significance when the liquid or molten metal is pure such as distilled molten potassium. The reasons for the problem is that no dust or dissolved gases are present which might ordinarily serve as nuclei for bubbles. The present invention has particular utility in just such cases, although it can be used with liquids or materials in which dust or dissolved gases are present.

The present invention essentially involves the use of ultrasonic energy in such a manner as to induce cavitation, causing nucleation of stable vapor bubbles which grow and thus prevent superheating and promote uniform boiling. Cavitation has been defined as a generic term applied to a number of ultrasonic effects characterized by the formation and collapse of bubbles in a liquid or molten material. Of all the phenomena associated with the passage of an intense sound wave through a liquid, the production of cavitation is probably the widest known but at the same time the least understood. Cavitation seems to be basically of two types, added bubbles filled with gas which is in the liquid or molten material and bubbles filled with a vapor of the liquid or material. The former appear at lower power levels and do not have the effects which the latter do. In accordance with the present invention, the ultrasonic energy should preferably be focused or directed in a liquid or a molten material so as to act on it substantially at or near the point where heat is applied to the liquid or molten material.

It is an object of the present invention to provide apparatus and/or method for preventing superheating of liquids or molten materials and thereby promote uniform boiling.

It is another object of the present invention to prevent superheating by creating cavitation in liquids or molten materials.

It is another object of the present invention to prevent superheating by promoting nucleation centers for the vapor phase of a liquid or molten material and thereby permit uniform boiling.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
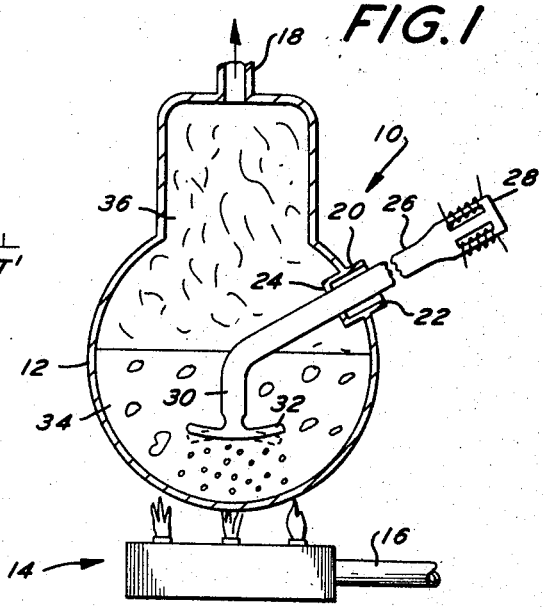
FIGURE 1 is a schematic sectional view of one embodiment wherein the present invention may be utilized.

Referring to the drawing in detail, wherein like numerals indicate like elements, there is shown in FIGURE 1 a boiler designated generally as 10. The boiler 10 includes a boiler housing 12 schematically illustrated and associated with a heat source designated generally as 14. Heat source 14 may be an oil or gas burner supplied with fuel by way of conduit 16. The boiler 10 is preferably provided with an outlet conduit 18 at its upper end.

Associated with the boiler 10, there is provided on the housing a means for preventing superheating of a flowable medium within the boiler. Such means may include a force-insensitive mount 20 metallurgically bonded to the wall of the boiler housing 12 at a flange on the mount 20. The flange is a radially outwardly extending annular flange located one-quarter wavelength (or an odd multiple thereof) distance from the unattached free end 22.

The mount 20 is a generally cylindrical sleeve having a resonant length of one-half wavelength (or whole number multiples thereof) for the material and geometry of the sleeve at the operating frequency of the transducer-coupling system as will be made clear hereinafter. The mount 20 is made from a suitable low hysteresis material such as steel. A true node will develop at the flange. For a more detailed description of such a mount, reference is made to U.S. Patents 2,891,180 and 2,891,178.

The end 24 of the mount is metallurgically bonded or otherwise connected to an acoustic coupler 26. Coupler 26 is a resonant member having one end connected to a magnetostrictive transducer 28 of conventional one-half wavelength construction comprising a laminated core of nickel, nickel-iron alloy, Permandur (an iron-cobalt alloy), Alfenol (an iron-aluminum alloy), or other magnetostrictive material, properly dimensioned to insure axial resonance with the frequency of the alternating current applied thereto by an excitation coil so as to cause it to decrease or increase in length according to its coefficient of magnetostriction. A detailed construction of a suitable magnetostrictive transducer, which in the illustrated embodiment comprises a nickel core, is well known to those skilled in the art and per se does not form a part of the present invention. Accordingly, no description of its construction will be made herein.

It will be appreciated by those skilled in the art that in place of the magnetostrictive transducer 28 shown in the drawings, other known types of transducers may be substituted. For example, electrostrictive or piezoelectric transducers, made of barium titanate, quartz crystals, etc., may be utilized. In addition to the excitation coil adapted to be connected to a power supply (not shown) incorporating an oscillator and a suitable amplifier, the transducer 28 is provided with a polarizing coil. The desirability of magnetically polarizing the transducer 28 by means of a polarizing coil, in order for the metal laminations to efficiently convert the applied energy into elastic vibratory energy, is readily understood by those skilled in the art.

The magnetostrictive transducer 28 is preferably metallurgically bonded in end-to-end contact with the coupler 26 at one end of the coupler 26. The coupler 26 may be any one of a wide variety of couplers known to the art, and is preferably made of suitable material such as steel, aluminum bronze, or Monel. In the embodiment illustrated in FIGURE 1, the end of the coupler 26 remote from the transducer 28 is provided with an angularly disposed tip portion 30. The outer periphery of coupler 26 is bonded to the end 24 of the mount 20. The tip portion 30 is metallurgically joined or otherwise connected at an antinode thereon to an antinode of a tip 32. Tip 32 is preferably a resonant tip. Tip 32 is preferably located so that the distance from the tip and the wall of housing 12 toward which the tip output is directed corresponds to an acoustical length of an odd whole number of one-quarter wavelengths of sound in the liquid 34. This will provide a reinforcement of the action on the tip as opposed to cancellation or some other condition.

The tip 32 may be a circular disk (see Patent 3,017,-792) having an annular nodal region of the vibration intermediate its circular periphery and the center thereof. The disk is metallurgically joined at its center to the tip portion 30. Alternatively, the tip 32 may be a free-free rodlike member as disclosed more clearly in Patent 3,054,309. As above indicated, the introduction of ultrasonic vibratory energy into the liquid 34 by the tip 32 will generate cavitation comprising bubbles filled with a vapor of the liquid 34. In other words, the vibratory energy induces cavitation in the liquid 34 to promote nucleation centers for the vapor phase of the liquid 34. As a result of the creation and collapse of such bubbles, the liquid 34 will boil uniformly rather than become superheated.

Heretofore, various workers in the field have induced cavitation in liquids to promote cleaning of metal parts disposed in the liquids, to determine the depth of the liquids, to ascertain the thickness of any foam layer on the liquids, etc. However, it is completely unexpected that such cavitation will prevent superheating of the liquid and thereby promote uniform boiling.

Figure 2:
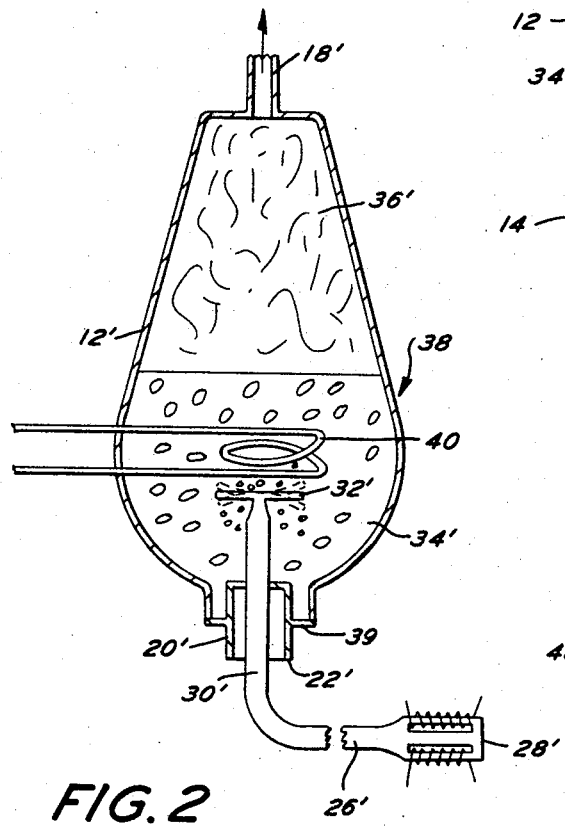
FIGURE 2 is a view similar to FIGURE 1 but illustrating environment in which the present invention may be utilized.

In FIGURE 2, there is illustrated diagrammatically a still pot designated generally as 38. The still pot 38 is substantially identical with the boiler 10 except as will be made clear hereinafter. Accordingly, corresponding structure is provided with corresponding primed numerals.

In the still pot 38, the means for heating the liquid 34' is at least partially disposed within the housing 12' and designated as 40. Heating means 40 may be an electrical heating coil. It will be noted that the tip 32' is adjacent to the heating coil 40. Also, it will be noted that the transducer-coupling system is orientated so as to enter the housing 12' from the bottom thereof. The radially outwardly directed flange on the mount 20' which develops a true node and facilitates supporting the mount from the housing 12' is designated as 39. Otherwise, the arrangement in FIGURE 2 is identical with the arrangement in FIGURE 1.

Figure 3:
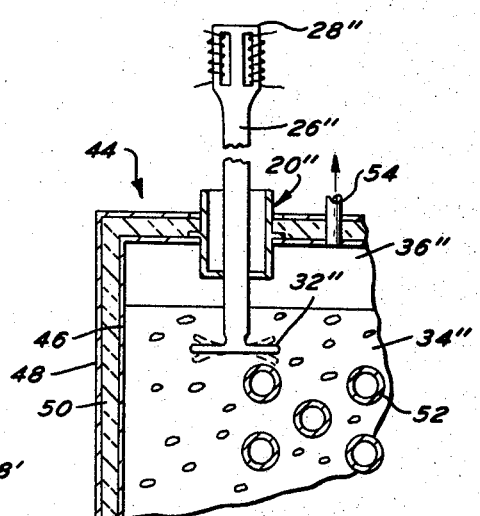
FIGURE 3 is a view similar to FIGURE 1 but illustrating another environment in which the present invention may be utilized.

In FIGURE 3 there is illustrated another embodiment of the present invention wherein a portion of a nuclear reactor 44 is illustrated. The reactor 44 may include a double-walled housing designated as 46 and 48 separated by insulation or water cooling designated as 50. The liquid 34'' in this embodiment may be a molten material as opposed to a conventional liquid. Thus, material 34'' may be a pure molten metal such as distilled potassium. It will be appreciated that the conventional heavy-walled construction and radiation shielding are only diagrammatically represented by the housing. Heat may be induced into the molten material 34'' by means of the induction coils 52 of conventional construction.

It will be noted that the tip 32'' is positioned adjacent the induction coils so as to induce cavitation in the hottest portion of the molten material 34''. The chamber 36'' above the level of the molten material 34'' may be evacuated by a conduit 54. Otherwise, the embodiment of FIGURE 3 is identical with that described above. Tip 32'' is spaced from the reactor wall in the direction of tip action by the same acoustical length described above in connection with tip 32.

Figure 4:
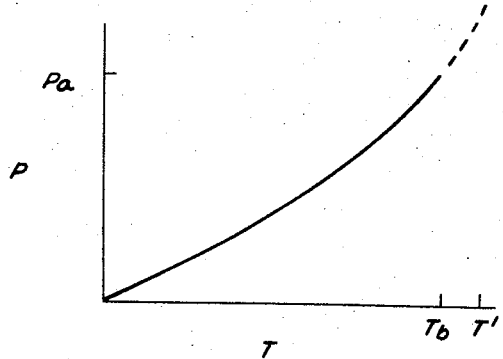
FIGURE 4 is a graph wherein vapor pressure is plotted against absolute temperature.

In FIGURE 4, there is illustrated the graph to show how vapor pressure varies with temperature according to the Clausius-clapeyron equation. In FIGURE 4, P stands for vapor pressure and T stands for absolute temperature. If equilibrium is maintained, the increase in vapor pressure is maintained until a temperature $T_b$ is attained where the vapor pressure reaches the ambient pressure $P_a$. At this relationship, ideally, boiling occurs with a phase change from liquid to vapor.

However, in actual systems where the phase change is occurring at a finite rate, superheating may occur. This super-heating corresponds to a higher temperature in the liquid phase, namely temperature $T'$ which is above the equilibrium boiling point $T_b$. This non-equilibrium situation arises because of the lack of presence of nuclei for the formation of vapor phase bubbles. The vibratory energy introduced into the liquids by the tips 32, 32' and 32'' induces cavitation which provides the nucleation centers required as described above. Hence, the temperature of the liquid never reaches the temperature $T'$ and thereby promotes uniform boiling at $T_b$.

While the present invention is adapted for use with almost any liquid or flowable molten material, it currently finds its greatest advantages in connection with flowable molten materials having an equilibrium boiling temperature greater than 500° F. since it is with such systems that prior art solutions to superheating cannot be utilized. As used hereinafter, the words "flowable material" are intended to refer to liquids, molten metals, and other flowable mediums which are subject to superheating considered to be undesirable and in which uniform boiling is desired.

Figure 5:
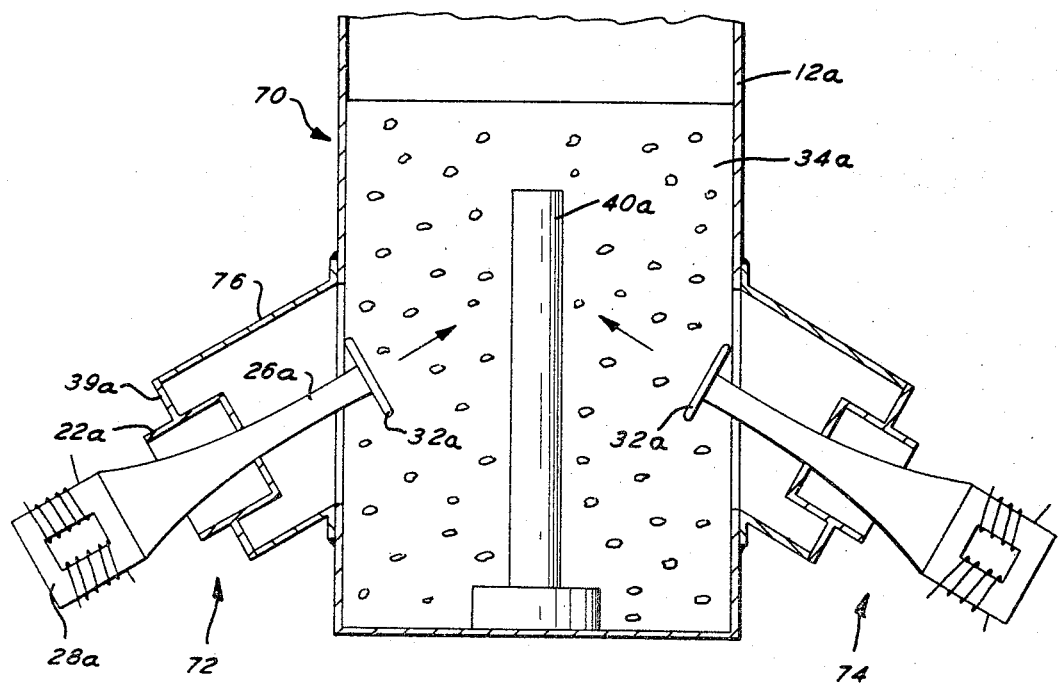
FIGURE 5 is a view similar to FIGURE 1 but illustrating another embodiment.

In FIGURE 5 there is disclosed another embodiment of the present invention designated generally as 70. This embodiment is identical with those illustrated in FIGURES 1 and 3 except as will be made clear hereinafter. Hence, corresponding numerals followed by the letter "a" have been applied to corresponding elements.

In FIGURE 5, two transducer-coupling systems 72 and 74 are provided on opposite sides of the housing 12a. The longitudinal axes of systems 72 and 74 have an included angle less than 180° and are directed so that an extension of the axes intersect at the heater means 40a within the liquid 34a. The systems 72 and 74 are identical. Hence, only system 72 will be described in detail.

The housing 12a is provided with a mounting structure 76. Structure 76 supports the system 72 such as by a metallurgical joint between the end of structure 76 and the flange 39a on force-insensitive mount 20a. The structure 76 may be a cylindrical sleeve and is constructed to support system 72 so that its longitudinal axis is directed upwardly toward heater means 40a at an acute angle with respect to a horizontal plane. It has been found that a right angle orientation of the systems in some arrangements did not perform as well as the acute angled orientation illustrated.

Tip 32a is preferably located so that the distance from the tip to the wall of housing 12a toward which the tip output is directed corresponds to an acoustical length of an odd whole number of one-quarter wavelengths of sound in liquid 34a. The direction of tip output is indicated by the arrows in FIGURE 5.

Each of the transducer-coupling systems in the embodiments of FIGURES 1, 2, 3 and 5 is designed to operate at substantially a given frequency, which is preferably a resonant frequency. Each resonant element is preferably dimensioned to have an overall physical length equivalent to an acoustical length of one-half wavelength (or a whole number multiple of one-half wavelength) in the material and geometry of which it is made at the said frequency, preferably in the longitudinal mode (except possibly for the tip), so as to have, for efficient operation, a substantially low-stress area at the interfaces.

The aforesaid power supply system, in a typical example, is capable of producing electrical signals in the range of between about 60 cycles per second and about 300,000 cycles per second. This frequency range is suitable for purposes of the present invention, including as it does frequencies in both the audible range (such as up to about 15,000 cycles per second) and the ultrasonic range (generally above about 15,000 cycles per second). A preferred frequency would be in the range of from about 3,000 to about 75,000 cycles per second, with the optimum being between about 14,000 to about 60,000 cycles per second. Normally, a frequency is chosen which will provide a suitable size of apparatus for a given application or set of applications, with the ultrasonic range having the further advantage of inaudibility for operator comfort.

It will be appreciated that the wattage indicated herein is exemplary only, and that power input may be varied according to the present invention taking into account such factors as the operating conditions utilized, the material being heated, and also the transducer-coupling system employed.

As is well known to those skilled in the art, power output (to the work) of acoustical vibration devices is not readily ascertainable directly, and indirect determination thereof often involves aspects not suitable for ready adjustment to differing industrial applications. Moreover, permissible power input is variable according to the type of transducer utilized and the acoustical coupler geometries and materials used, as well as such factors as the efficiencies of joints between the various members of the transducer-coupling system. For example, a magnetostrictive transducer is far more rugged and trouble-free than a ceramic transducer, but it has a lesser efficiency in converting electrical power into mechanical vibration, and steel is a more readily machinable and joinable coupler material than Monel or beryllium-copper but it has a lesser acoustical transmission efficiency.

For purposes of insuring a sufficient level of acoustical energy for purposes of the present invention, it is to be noted that provision has been made, in addition to a sufficient level of electrical power input to the transducer, for acoustical amplitude transformation, if necessary or desirable, and for appropriate support-mounting.

Thus, the apparatus may be constructed to operate at 50,000 cycles per second, for example. In one operative embodiment, an electrical power input of only eight watts to a single magnetostrictive transducer at said 50 kc. design frequency sufficed to cavitate atmospherically-boiling water or water boiling at reduced pressure (28 mm.) and prevent superheating and promote uniform boiling.

As is well known to the art, the electrical frequency of an alternating current power supply (such as 60 cycles per second) is changed to match the mechanical or elastic vibratory frequency of the transducer (50,000 cycles per second in this example, as aforesaid).

For a description of a type of ceramic transducer which may be used, see United States pending patent application No. 456,900 filed May 11, 1965 in the names of James Byron Jones and Nicholas Marpois and entitled "Transducer Assembly".

As aforesaid, fixedly scured (preferably by brazing or some other type of metallurgical joint) in end-to-end contact with the transducer is an acoustical coupling member. The coupling member is preferably made from aluminum-bronze, beryllium-copper, K-Monel, or any other material having low hysteresis. The materials named are non-magnetic and are known to the art for their relatively good acoustical power handling qualities. However, special materials may be used for special purposes including corrosion-resistant materials for severe liquid environments so long as such materials will vibrate suitably.

The acoustical coupler members are essentially acoustical transmission lines and may be mechanical transformers and of contoured construction, for purposes including providing for an increase in the amplitude of vibration. As aforesaid, each acoustical coupler member has a physical length equivalent to an acoustical length of an integral number of one-half wavelengths in the material of which it is made at the design frequency for the apparatus.

Each acoustical coupler member may comprise a single member or, for purposes of manufacturing or other engineering convenience, it may comprise two or more members joined in end-to-end contact, the tapered portions, if any, by means of their increasingly smaller cross section affording the increased amplitude. The tapered portions may be shaped so as to provide a linear taper, for example, or a taper that is an exponential function of its length and satisfies the following equation:

$$S = S_o e^{-2Tl}$$

where $S$ is the reduced area at any section of the tapered portion, $S_o$ is the area of the untapered portion, $T$ is a constant describing the taper, and $l$ is the length of the tapered portion. This equation and the boundary conditions for resonance of couplers are set forth at page 163 of Piezoelectric Crystals and Ultrasonics by Warren P. Mason, published in 1950 by D. Van Nostrand Company.

In accordance with principles well known to those skilled in the art, for efficient operation as for avoiding changes in sound velocity, mode, etc., the solid-portion-diameter cross section of each coupler member is no more than about one-half and preferably no more than about one-quarter wavelength.

Each coupling member is of rod-like construction whose length, subject to the length limitations aforesaid, may be adjustable in accordance with the application in which it is to be used.

The vibratory apparatus may if desired be made of appropriate length so that the temperature- and radiation-sensitive parts of the equipment (transducer, windings, generating equipment, and appropriate auxiliary gear) can be located conveniently outside of an extraordinary environment with only the terminal end in the environment. Suitable screw-connection of a portion of each coupler member also would render the terminal tip replaceable in the event of undesired erosion, corrosion, or other effects thereon, or in the event of need for a different length or material for the coupler member or a different material or size for the tip.

While each transducer and its coupler member vibrate axially (see description of longitudinal vibration of bars, at pages 62–64 of Elements of Acoustical Engineering by Harry F. Olson, 2d edition, 1947, D. Van Nostrand Company, Inc.), each tip illustrated vibrates in a flexural mode of vibration (see description of transverse vibration of bars, pages 52–56 of the same test). Each coupler member and tip are preferably joined in an antinode-to-antinode (loop to loop) arrangement for purposes of maximum transfer of energy from the member to the tip. Therefore, dimensioning of tips is preferably in accordance with Fig. 3.2D (page 52) of the aforesaid book by Olson, especially at the fundamental frequency or the second or other even-numbered overtome thereof in view of the aforesaid joining arrangement. Each tip preferably has a physical length corresponding to an acoustical one-half wavelength (or whole unit multiple thereof) at the fundamental resonant frequency.

In the described embodiment, designed to operate as aforesaid at a nominal fundamntal resonant frequency of 50 kilocycles per second, the tip may be in the form of a thin rectangular plate made of steel.

While the embodiment of FIGURE 5 has been described in connection with a particular system orientation, it will be appreciated that other geometries of orientation may be used, although with some sacrifice in effectiveness or sensitivity (also see description of FIGURES 1, 2, and 3).

The force-insensitive mount comprises a sleeve fixedly secured at one end to the coupler member. The opposite end of the sleeve is free from securement with the coupler member. A radially outwardly directed flange is provided on the mount intermediate its ends and is attached to the housing, vessel or other support. The force-insensitive mount, which is dimensioned to operate at the nominal frequency of the device, permits the apparatus to be mounted on the housing, vessel or an external member without transmitting any appreciable amount of vibratory energy thereto. The device will operate without it, but its inclusion is preferred for best operation (as for minimizing damping, frequency shift, etc.).

The flange of the force-insensitive mount is fixedly joined to the housing or vessel in such manner as to provide a hermetic seal. It is to be noted that the joinder of one end of the mount to coupler member constitutes another hermetic seal.

In FIGURES 1 and 2, the coupler member which is secured to the tip is shown to be elongated and bent, an arrangement which is advantageous for mounting the system in a position where it may be easily maintained and disposed remote from the liquid or the heater means. As aforesaid, such elongated coupler members have a maximum cross-sectional dimension which is preferably not more than about one-quarter wavelength in the material of which they are made at the frequency of operation. They can be of substantial length with no immediately evident limits, although, due to hysteresis losses in materials, their length should probably be less than around 15 to 25 feet for efficient operation, and a length of up to about 5 feet is generally sufficient. The bendability or formability of the material of such acoustical couplers enables them to be bent so as to circumvent obstructions. For efficient power transmission along such couplers, the bend radius and other limitations are set forth in detail in U.S. Patent 3,166,840 issued Jan. 26, 1965 by Dennison Bancroft et al., entitled "Apparatus and Method for Introducing High Levels of Vibratory Energy to a Work Area."

If, in a given application, the presence of cavitation can be neither seen nor heard, it can be ascertained by means of the invention described in United States patent application Ser. No. 457,614 filed May 21, 1965 entitled "Apparatus and Method for Acoustic Instrumentation" in the names of Herbert Kartluke and Charles A. Boyd, the disclosure of which is incorporated herein by reference.

The present invention may be embodied in other specific forms without departing from the spirit or essential attributes thereof and, accordingly, reference should be made to the appended claims, rather than to the foregoing specification as indicating the scope of the invention.

It is claimed:

1. A method of promoting uniform boiling comprising the steps of heating a molten material to its boiling point, promoting uniform boiling in said material by inducing cavitation in the material at the location where the material is the hottest and thereby provide nucleation centers for the vapor phase of said material.

2. A method in accordance with claim 1 wherein said material has a boiling point above 500° F., and maintaining an evacuated vapor chamber above said material.

3. A method in accordance with claim 1 wherein said material is potassium.

4. A method in accordance with claim 1 wherein said step of inducing cavitation includes introducing a resonant tip into the material, and ultrasonically vibrating the tip by means of a transducer means exterior of a vessel containing said material.

5. A method in accordance with claim 1 including positioning a cavitation inducing tip in the molten material so that the acoustical distance from the tip to a wave reflecting surface is an odd whole number multiple of one-quarter wavelengths of sound in the molten material.

6. A method of promoting uniform boiling comprising the steps of heating a material having a boiling point at a temperature above 500° F. to that temperature so that the material has the attributes of a liquid, promoting uniform boiling of the material by the continuing application of heat in combination with inducing cavitation in the material through the use of a resonant tip in contact with the material at the location where the material is at its highest temperature, said cavitation providing nucleation centers which permits a smooth transition of discrete amounts of the material to the vapor phase, while the material is disposed in a generally closed vessel.

7. A method in accordance with claim 6 including the step of heating the material by means of a heat source disposed internally of the vessel.

8. A method of boiling a fluid material without localized superheating comprising the steps of heating the fluid material with the application of sufficient heat energy to the material to permit the transition of at least a portion of the fluid material from the liquid phase to the vapor phase, subjecting the fluid material to the application of acoustical energy focused in that portion of the fluid material in proximity to the source of the heat energy where the latent heat of vaporization has been satisfied, the frequency and energy level of the energy producing cavitation within the fluid material to form a multiplicity of nucleation centers where the latent heat of vaporization has been satisfied, whereby at least a portion of the fluid material is smoothly transitioned into the vapor phase at such centers thereby providing for vapor phase-liquid phase equilibrium through the formation of a small bubble of vaporized fluid material within the body of the fluid material and preventing superheating of the fluid material.

References Cited

UNITED STATES PATENTS

| | | | |
|---|---|---|---|
| 2,514,797 | 7/1950 | Robinson | 165—84 X |
| 2,664,274 | 12/1953 | Worn et al. | 165—84 X |
| 2,891,178 | 6/1959 | Elmore | 310—26 |
| 2,891,180 | 6/1959 | Elmore | 310—26 |
| 3,017,792 | 1/1962 | Elmore et al. | 228—1 |
| 3,042,481 | 7/1962 | Coggeshall | 165—84 X |
| 3,054,309 | 9/1962 | Elmore et al. | 228—1 |

FOREIGN PATENTS 532,144   1/1941   Great Britain.

ROBERT O. O'LEARY, *Primary Examiner.*

A. W. DAVIS, *Assistant Examiner.*